US010359321B2

(12) United States Patent
Trifonov et al.

(10) Patent No.: US 10,359,321 B2
(45) Date of Patent: Jul. 23, 2019

(54) ON-CHIP CIRCUIT AND METHOD FOR ACCURATELY MEASURING DIE TEMPERATURE OF AN INTEGRATED CIRCUIT

(71) Applicant: Texas Instruments Incorporated, Dallas, TX (US)

(72) Inventors: Dimitar Trifonov, Vail, AZ (US); Habib Sami Karaki, Sunnyvale, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 475 days.

(21) Appl. No.: 14/925,703

(22) Filed: Oct. 28, 2015

(65) Prior Publication Data

US 2016/0178450 A1    Jun. 23, 2016

Related U.S. Application Data

(60) Provisional application No. 62/096,459, filed on Dec. 23, 2014.

(51) Int. Cl.
*G01K 7/00* (2006.01)
*G01K 7/16* (2006.01)
*G01K 7/01* (2006.01)

(52) U.S. Cl.
CPC ........ *G01K 7/16* (2013.01); *G01K 7/01* (2013.01)

(58) Field of Classification Search
None
See application file for complete search history.

(56) References Cited

U.S. PATENT DOCUMENTS

| 7,686,508 | B2* | 3/2010 | Lin | G01K 7/015 |
| | | | | 327/512 |
| 2006/0093016 | A1* | 5/2006 | McLeod | G01K 1/028 |
| | | | | 374/178 |
| 2009/0323763 | A1* | 12/2009 | Raychowdhury | G01K 7/015 |
| | | | | 374/170 |
| 2013/0218512 | A1* | 8/2013 | Kim | G01K 7/00 |
| | | | | 702/130 |

* cited by examiner

*Primary Examiner* — Lisa M Caputo
*Assistant Examiner* — Nasir U. Ahmed
(74) *Attorney, Agent, or Firm* — Andrew Viger; Charles A. Brill; Frank D. Cimino

(57) ABSTRACT

An integrated circuit and method are provided for accurately measuring the temperature of a die of the integrated circuit. Pairs of diodes are driven with different currents in order to generate a series of thermal voltages. The ADC measures the series of thermal voltages against an external reference voltage. Based on these thermal voltage measurements, the ADC calculates the die temperature. The different currents used to generate the series of thermal voltages are selected at specific ratios to each other in order to promote the ability of the ability of the ADC to calculate the die temperature using standard components and logic of an ADC. These thermal voltages are generated and measured using integrated components of the die for which a temperature measurement is being provided, thus reducing several sources of inaccuracies in conventional die temperature measurement techniques. Addition embodiments are provided for detecting defective diodes based on comparisons of the thermal voltage outputs.

18 Claims, 2 Drawing Sheets

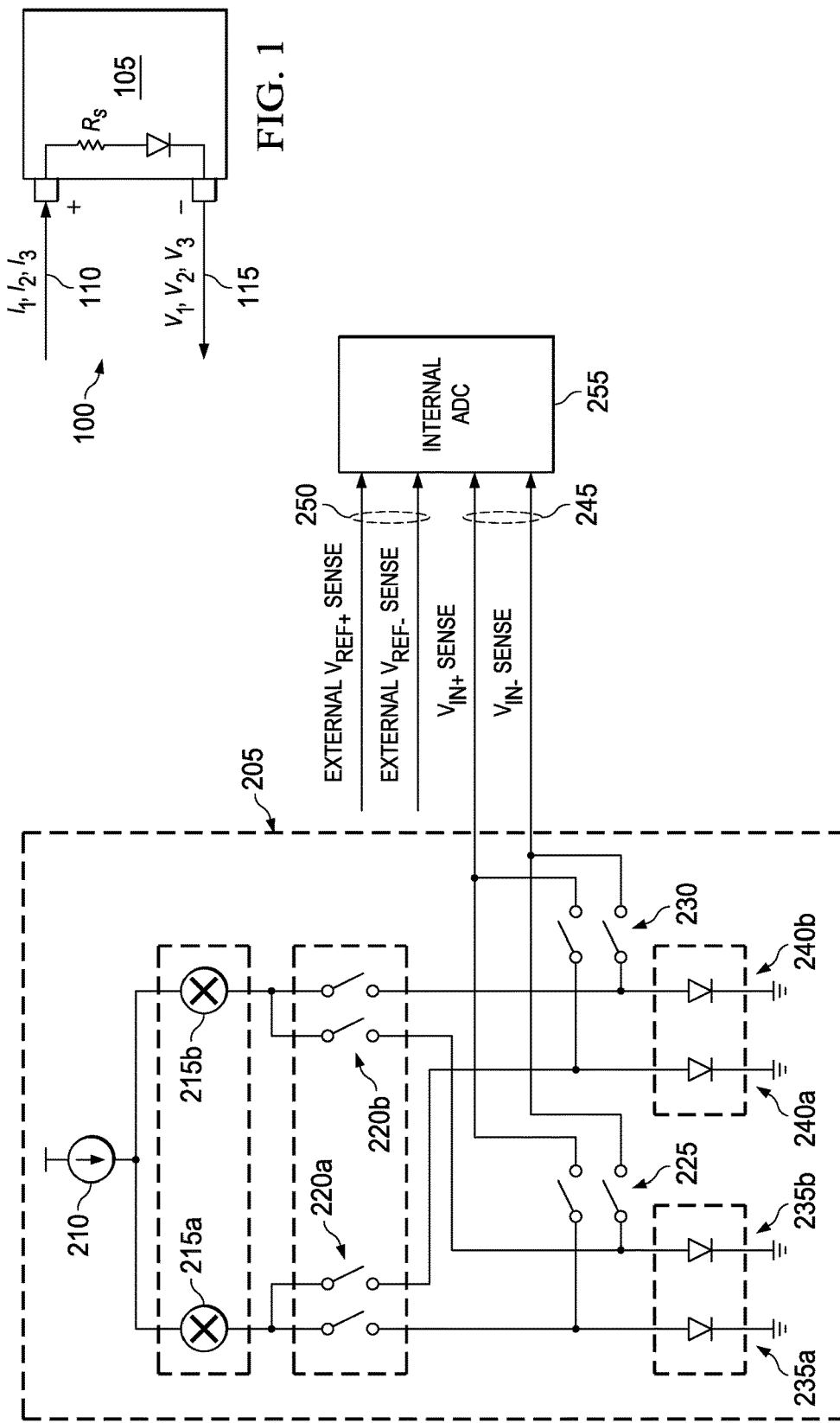

ON-CHIP CIRCUIT AND METHOD FOR ACCURATELY MEASURING DIE TEMPERATURE OF AN INTEGRATED CIRCUIT

CROSS-REFERENCE TO RELATED APPLICATIONS

The present application claims the benefit of the filing date of Provisional Application No. 62/096,459, filed Dec. 23, 2014.

TECHNICAL FIELD

The recited claims are directed, in general, to temperature sensors and, more specifically, to improving the accuracy of temperature sensor measurements.

BACKGROUND

Temperature sensors provide electronic devices with temperature measurements that can be used to signal overheating conditions and allow adjustments to be implemented before the overheating rises to damaging levels. Temperature sensors may also be used as components of industrial process control systems, environmental monitoring systems or in a wide variety of other applications. Temperature sensors may also be used during the development phase of an electronic device in order to measure heat buildup in the device. Based on the information provided by the temperature sensors, engineers can adjust the design of the device in order to maintain device temperatures within certain tolerances. In both production and development scenarios, the accuracy of the temperature sensor is crucial.

Certain temperature sensors may be integrated into a device being monitored by integrating certain components of the sensor within an integrated circuit of the device electronics. In these on-chip temperature sensors, temperature information may be collected by measuring the temperature of the die in which the sensor is integrated. Typically, the die temperature can be determined using sensors that are configured to measure a thermal voltage generated by a component integrated into the die, such as a diode or bipolar junction transistor. This thermal voltage output can then be used to calculate the temperature of the die.

The performance characteristics of temperature sensors that rely on thermal voltage measurements can vary significantly from device to device due to variances in the manufacturing process. In applications such as temperature sensors that require high accuracy and precision, each individual sensor may be adjusted (i.e., trimmed) in order to account for the manufacturing variances and confirm the operating characteristics of the sensor prior to deployment. Prior to trimming a temperature sensor, the accuracy of the sensor must first be determined. There are two principle mechanisms for measuring the accuracy of a temperature sensor.

The first mechanism for determining the accuracy of a temperature sensor involves controlling the ambient temperature of the device while taking measurements with the sensor. Any difference between the ambient temperature and the measured temperature reflect variances in the sensor's accuracy. Once identified, these discrepancies in the sensor's accuracy can be accounted for by trimming the sensor. In this method, the ambient temperature may be controlled by either controlling the air surrounding the device to a desired temperature or by dipping the device into a thermal fluid bath set at the desired temperature. Both of these approaches require specialized hardware that is expensive to purchase, operate and maintain.

In certain scenarios, the accuracy of the testing measurements themselves may be uncertain. For instance, where forced air is used, such as an oven, maintaining a stable temperature is complicated due to temperature gradients that can form within the controlled environment in which the test is being conducted. Such gradients can be partially eliminated by circulating the forced air that is used, but this itself introduces uncertainty to the highly precise testing measurements made using the sensor.

Another disadvantage of this first mechanism is the time required for each individual measurement. Before any measurements can be made with the sensor, this method requires the device to settle to the desired temperature. This settling time can be very slow depending on several factors such as the starting die temperature, the different packaging that may be used with the sensor and the different handling and testing equipment that may be used in this process. The different settling characteristics of thermal fluid versus forced air flow may add further uncertainty that may often be resolved by extending the settling time.

A second mechanism for determining the accuracy of a temperature sensor involves simulating its use. A set of thermal voltages is obtained by forcing a series of discrete currents as inputs to the diodes or other thermal voltage generating component of the temperature sensor. The generated thermal voltage information can then be used to calculate the die temperature. Since this method simulates use of the sensor in a test environment using a sensor that has not yet been trimmed, numerous sources of measurement error are possible. Additionally, this method requires highly calibrated external current sources capable of reliable precision. Numerous disadvantages and a more detailed description of this conventional method are provided below.

A need is present for a mechanism by which the accuracy of temperature sensor can be determined without relying on methods that require controlling ambient temperatures while also avoiding certain of the numerous disadvantage of using conventional simulated forced-current measurements.

SUMMARY OF THE INVENTION

According to various aspects of the Application, an integrated circuit and method are provided for accurately measuring the temperature of a die of the integrated circuit. Pairs of diodes are driven with different currents in order to generate a series of thermal voltages. The ADC measures the series of thermal voltages against an external reference voltage. Based on these thermal voltage measurements, the ADC calculates the die temperature. The different currents used to generate the series of thermal voltages are selected at specific ratios to each other in order to promote the ability of the ADC to calculate the die temperature using standard components and logic of an ADC. These thermal voltages are generated and measured using integrated components of the die for which a temperature measurement is being provided, thus reducing several sources of inaccuracies in conventional die temperature measurement techniques. Addition aspects of the Application may be used for detecting defective diodes based on comparisons of the thermal voltage outputs.

According to one aspect of the Application, a temperature sensor integrated circuit comprises a die; a thermal voltage source operable to generate pairs of thermal voltages, wherein each of the pair of thermal voltages varies with the temperature of the die, and wherein the thermal voltage source is a component of the die; and an ADC operable to receive an external reference voltage provided as an input to the temperature sensor integrated circuit and further operable to receive the pairs of thermal voltages, wherein the ADC is further operable to calculate a PTAT voltage based on pairs of thermal voltages and an external reference voltage, and wherein the ADC is a component of the die.

According to another aspect of the Application, the thermal voltage source is comprised of a first pair of diodes configured to generate first pair of thermal voltage outputs. According to another aspect of the Application, the thermal voltage source is further comprised of a second pair diodes configured to generate a second pair of thermal voltage outputs. According to another aspect of the Application, the ADC is further operable to calculate the difference between the first pair of thermal voltages or the difference between the second pair of thermal voltages. According to another aspect of the Application, the pairs of thermal voltages are generated using three currents of three different current levels. According to another aspect of the Application, the ratios between each of the three different currents levels are selected such that the ADC calculates the PTAT voltage using addition and subtraction operations. According to another aspect of the Application, the first pair of diodes comprises two matching diodes of a first type and the second pair of diodes comprise two diodes of a second type. According to another aspect of the Application, a fourth pair of thermal voltage outputs is generated by forcing the same current onto both diodes from the first pair of diodes. According to another aspect of the Application, the first pair of diodes generate a first thermal voltage and the second pair of diodes generate a second thermal voltage, and wherein a discrepancy in the first thermal voltage and the second thermal voltage is used to detect a discrepancy in an ideality factor of a diode from the first pair of diodes or the second pair of diodes. According to another aspect of the Application, the thermal voltage inputs to the ADC are generated using a force sense connection. According to another aspect of the Application, pair diagnostic thermal voltages is generated by forcing the same current onto both diodes from the first pair of diodes, wherein the diagnostic pair of thermal voltages is used to detect defects with the first pair of diodes.

BRIEF DESCRIPTION OF THE DRAWINGS

Figure 3:
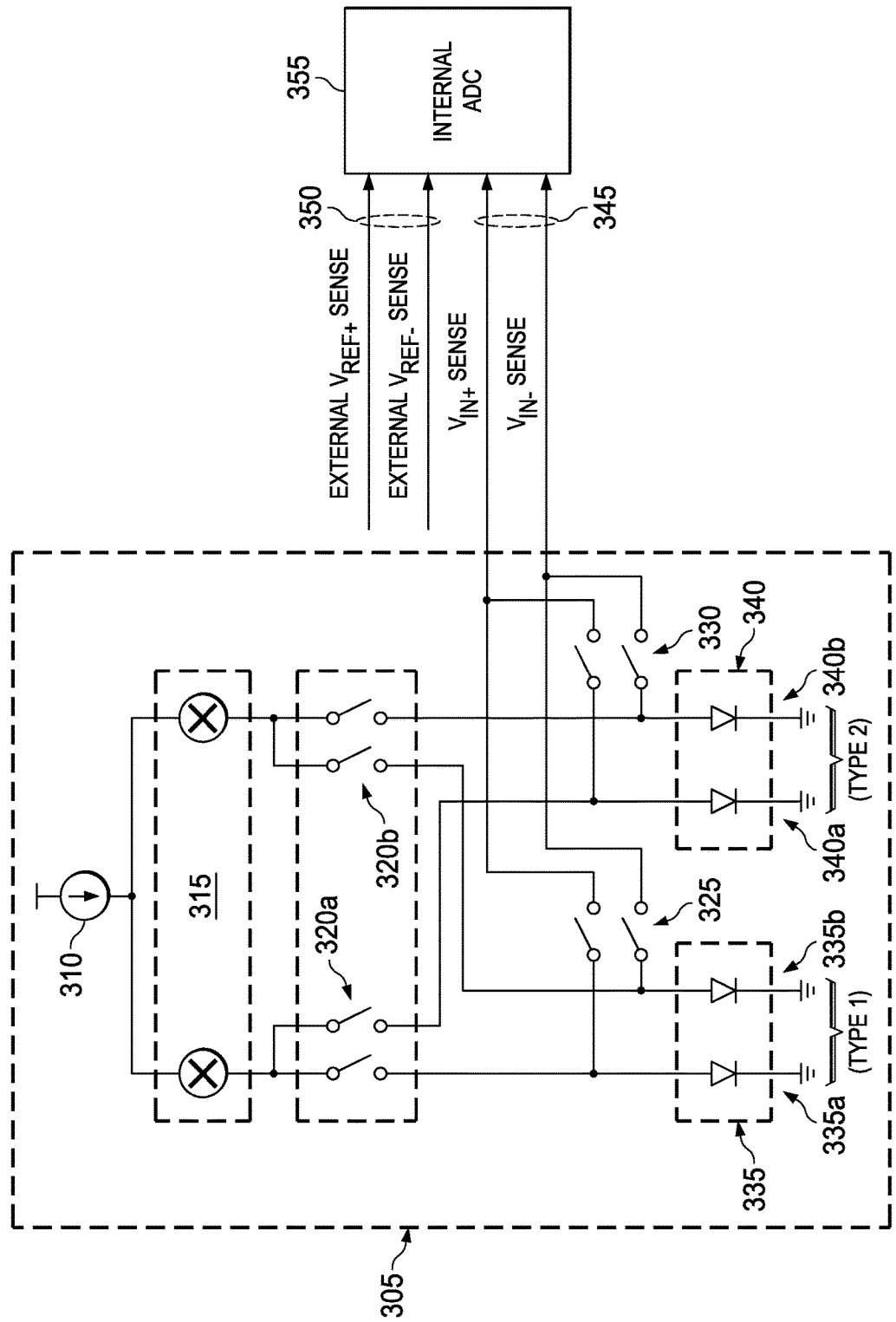

Having thus described the invention general terms, reference will now be made to the accompanying drawings, wherein:

FIG. 1 is a circuit diagram of a conventional temperature sensor.

FIG. 2 is a circuit diagram illustrating certain components of a temperature sensor according to one embodiments.

FIG. 3 is a circuit diagram illustrating certain components of a temperature sensor according to another embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates a circuit diagram of a temperature sensor 100 that relies on a conventional forced current process to determine the accuracy of the temperature sensor. Temperature sensor 100 utilizes on-chip diode 105 to generate a thermal voltage that is correlated to the temperature of the die on which the temperature sensor is integrated. Components other than a diode may be utilized in the temperature sensor 100. For instance, bipolar junction transistors (BJTs) are also known to provide a thermal voltage output that can be used to ascertain the temperature of the die surrounding the transistor.

In the temperature sensor 100 of FIG. 1, the accuracy of the on-chip diode 105 in generating a thermal voltage that reflects the die temperature is evaluated by forcing a series of discrete currents 110 as inputs to the diode. For each discrete current 110 input, the corresponding thermal voltage 115 generated by the on-chip diode 105 is measured. The relationship between the level of the current forced to the sensor, the measured voltage and the temperature of the die is provided by the following equation, where V is the voltage output of the diode, which may also be known as the thermal voltage, I is the forced current input, $R_s$ is the series resistance of the diode, n is the ideality factor of the diode, $I_s$ is the saturation current of the diode, T is the temperature of the die in which the diode is integrated, k is Boltzmann's constant and q is the elementary charge constant.

$$V = \frac{nkT}{q}\ln\left(\frac{I}{I_s}\right) + IR_s$$

This measurement of a thermal voltage is repeated three times, generating $V_1$, $V_2$ and $V_3$, each time using a different forced current, $I_1$, $I_2$ and $I_3$, respectively. Combining the equations corresponding to the three measurements results in the equation for die temperature below.

$$T = \frac{q}{nk} \times \frac{\left(\frac{I_3 - I_2}{I_2 - I_1}\right)(V_2 - V_1) - (V_3 - V_2)}{\left(\frac{I_3 - I_2}{I_2 - I_1}\right)\ln\left(\frac{I_2}{I_1}\right) - \ln\left(\frac{I_3}{I_2}\right)}$$

Using the above equations in the conventional process illustrated in FIG. 1 suffers from several problems when used for determining the accuracy of temperature measurements made using an on-chip diode. First, in order for this conventional forced current method to generate accurate results, the levels of the discrete currents, $I_1$, $I_2$ and $I_3$ used as inputs must be very precise. Even minor calibration errors in these forced currents can result in significant inaccuracies in the above temperature calculations. Consequently, in order for this process to generate reliable results, the test equipment used must be able to generate highly precise and accurate currents as inputs.

An additional problem faced by the conventional process of FIG. 1 is the loss of accuracy in the input currents as a result of current leakages. The ability to deliver accurate input currents is limited by various aspects of the circuit board on which the on-chip diode is incorporated. For instance, potentially significant current leakage may be present at the traces and vias present in the circuit board, the utilized pin interfaces and any ESD (electrostatic discharge) components. In the test environment, non-negligible current leakage may occur via the cables used to deliver the current to the circuit board. These leakage sources can vary significantly between temperature sensor devices and are very difficult to control. Due to these current leakages, the precision of the delivered current source is affected and, in turn, the accuracy of the thermal voltage measurements taken using the temperature sensor are likewise affected.

Another shortcoming of the conventional process of FIG. 1 is the reliance on the assumption that the on-chip diode being tested is free of defects and that the diode actually operates according to its advertised capabilities. In reality, the performance characteristics of on-chip diodes can vary significantly due to defects and manufacturing variances that occur within any batch of diodes and are not known for any individual diode that is manufactured. Due to these variations between individual diodes, the voltage measurements made using the conventional process may reflect the effects of such defects in addition to the temperature measurement properties of the diode. Consequently, the accuracy of temperature measurements may be significantly compromised by manufacturing variances present in the on-chip diode used to collect the measurements.

Noise in the inputs to the on-chip diode can provide additional sources of inaccuracies in conventional temperature sensors such as illustrated in FIG. 1. Once rectified by the diode, the noise in the input to the diode has a non-zero average, thus resulting in measurement error, this error further compromising the accuracy of the measurements made using the diode. In a test environment, the cables used to connect the temperature sensor to the test equipment may be relatively long and consequently may be susceptible to the introduction of noise.

Another problem encountered in the conventional process of FIG. 1 is the need to maintain a constant die temperature throughout the duration of the series of forced current pulses. Thermal diode voltages are highly sensitive to temperature changes in the die. The thermal voltage of a typical diode may vary by 2 mV for every 1° C. change in the die temperature. In such circumstances, a temperature change of only 1° C. in the die during the time required to complete a series of forced current measurements may result in a calculated temperature that is up to 10° C. in error. The fact that the process for generating a series of measurements in this manner is relatively slow increases the possibility of temperature changes in the die before the series of measurements has been completed.

Yet another shortcoming of using conventional forced current measurements is the self-heating that results from forcing currents in the temperature sensor. A diode will typically self-heat to a slightly different temperature when forced with different levels of current. The self-heating of the diode further reduces the accuracy of the die temperature measurement. In a typical diode, the magnitude of the self-heating in the diode may result in a temperature measurement error that is ten times greater than the magnitude of the self-heating.

Another problem in the conventional forced-current measurement process of FIG. 1 is the error resulting from non-linear series resistance in the on-chip diode. The above equations assume that the series resistance, $R_s$, of the diode is linear with respect to different forced current levels. In reality, the series resistance of a diode may be nonlinear in manner similar to a MOSFET switch. The measurement error resulting from non-linear series resistance results in still further degradation in the accuracy in the temperature measurements provided by the temperature sensor.

In the above equations, the calculation of a thermal voltage relies on a variable, n, representing the ideality factor of the diode. This ideality factor compensates for second-order characteristics of the diode, where these second-order characteristics are not otherwise represented in the die temperature calculations. The above equations assume that the ideality factor, n, is constant for all diodes. In reality, manufacturing variances can cause slight variations from the ideality factor such that the accuracy of the temperature measurements may be further compromised.

Due to accumulation of the above issues, test times for a series of forced current measurements can take a relatively tong time. As described above, the currents used to force the diode must be highly precise, which necessitates providing a significant settling time between measurements. In certain scenarios, additional time may be required to allow for settling of temperatures in the die and/or the diode. As a result, a series of high-accuracy temperature measurements can take a relatively long time to complete. In a mass production manufacturing setting, any amount time that can be saved in generating accurate sensor readings that can be used in trimming the sensor may be multiplied many times over, thus significant improving efficiency.

In order to address the above shortcomings of conventional temperature sensors, embodiments of the claimed invention provide the ability to generate more accurate temperature measurements using an on-chip diode. Many of the shortcomings of conventional sensors are due to the reliance on highly precise external currents and/or as a result of the adverse impact to accuracy that caused by variances in individual diodes. These shortcomings are addressed at least in part, according to various embodiments, by the use of components of the temperature sensor itself to generate and measure a PTAT thermal voltage. Whereas conventional sensors rely on external currents to generate a thermal voltage that is measured externally, embodiments rely on temperature measurements made internal to the sensor using a set of PTAT thermal voltages in a manner that negates or at least mitigates the effects of many of the described disadvantages of conventional sensors.

FIG. 2 is a circuit diagram that illustrates certain components of a temperature sensor according to various embodiments. The temperature sensor of FIG. 2 utilizes a thermal voltage source 205 that generates pairs of thermal voltage outputs. In the embodiment of FIG. 2, thermal voltage outputs are generated using two pairs of diodes 235a-b, 240a-b, the two diodes of each pair being substantially identical. Pairs of thermal voltage outputs are generated by forcing different currents onto the two identical diodes of one of the pairs of diodes. The difference between the thermal voltage outputs of the two diodes is proportional to the temperature (PTAT) of the die on which the voltage source 205 is implemented.

The voltage source 205 utilizes two pairs of diodes 235a-b, 240a-b to generate pairs of thermal voltages that are differenced to derive a PTAT voltage that can then be used to calculate the die temperature. Each pair of diodes, 235a-b, 240a-b is comprised of two matching diodes of the same technical specifications. As described above, manufacturing variances may preclude the two matching diodes from being exactly identical, but may nonetheless both be provided under the same technical specifications. As will be described further, by using pairs of diodes, the effects of these variances can be significantly reduced with respect to their adverse impact on accuracy in the conventional sensor of FIG. 1.

In the temperature sensor of FIG. 2, each of the diodes in the two pairs of diodes 235a-b, 240a-b is configured to generate a thermal voltage that is correlated in magnitude to the temperature of the die in which the diodes are integrated.

Certain embodiments may utilize pairs of components other than diodes to generate a thermal voltage correlated with the temperature of the die. As described, bipolar junction transistors may be utilized in this manner. Other types of transistors may also be used in pairs to generate a thermal voltage. Regardless of the component used to generate the thermal voltages, manufacturing variances will cause some variation in operational behaviors between individual components. By utilizing a pair of thermal voltage generating components according to various embodiments, the effects of these variances on accuracy can still be significantly reduced.

The thermal voltage source 205 generates discrete pairs of thermal voltage outputs by forcing a series of different currents onto the pairs of diodes 235a-b, 240a-b. The thermal voltage source 205 includes a set of identical current sources 210. Each individual current source from this set 210 of identical current sources may be selected individually or combined into groups in order to create various different ratios of current levels. The identical output currents supported by current source 210 are selected individually or in groups by the current rotation switches 215a, 215b, thus selecting two different currents of a certain ratio to each other. The two selected currents are thus provided as a forced current inputs to a pair of diodes in order to generate a pair of thermal voltage outputs.

The current rotation switches 215a, 215b are configured to select a current using the set of currents provided by the current source 210 and route the selected current to one of the associated diode selection switches 220a, 220b. In the embodiment illustrated in FIG. 2, each of the current rotation switches 215a, 215b is associated with a single diode selection switch 220a, 220b. Other embodiments may utilize different components and/or different configurations of components for selecting available currents and routing the selected current sources as forced current inputs to a thermal voltage generating component, such as diodes. As described below, the selection of current levels by each of the current rotation switches 215a, 215b is configured in a manner such that pairs of thermal voltage outputs generated by pairs of diodes selected from 235a-b, 240a-b can be differenced by ADC 255 for use in calculating the PTAT voltage, which in turn may be used to calculate the die temperature.

Once a current level is configured b the selection of one or more currents from the current source 210 by one of the current rotation switches 215a, 215b, the configured current is provided as an input by a diode selection switch 220a, 220b to one diode selected from the two diode pairs 235a-b, 240a-b. In one scenario, diode selection switch 220a routes a configured current as a forced current input to diode 235a and diode selection switch 220b routes a different configured current as forced current input to diode 235b. The thermal voltage outputs generated by diode 235a and 235b are routed as inputs to ADC 255 via configuration of switches 225 and 230. By selecting different current levels as forced current inputs to diode 235a and diode 235b, the difference between the thermal voltage outputs of diode 235a and 235b is proportional to the absolute temperature (PTAT) of the die.

As described above, the accuracy of temperature sensor measurements may be adversely affected be a variety of factors, including the series resistance of the diodes used to generate a thermal voltage. Even if this series resistance is accounted for in the equations used to calculate a die temperature from a generated PTAT voltage, variations in actual series resistance and non-linear series resistance behavior can nonetheless cause certain measurement errors.

According to various embodiments, the impact of this series resistance can be eliminated entirely from the determination of die temperature by using a set of three or more different current sources to generate three or more corresponding thermal voltages pairs, from which the PTAT voltage can be calculated without having to account for any series resistance.

In a scenario where three different current sources, $I_1$, $I_2$ and $I_3$, are utilized as forced inputs, three different thermal voltages, $V_1$, $V_2$ and $V_3$, are generated. By using three different current sources, the PTAT voltage, $V_{PTAT}$, can be calculated according to the equation below. Unlike the equations provided above that govern die temperature calculations in conventional devices, the series resistance, $R_s$, of the diodes is cancelled out according to various embodiments by differencing pairs of thermal voltage generated using the three different current sources.

$$V_{PTAT} = \left(\frac{I_3 - I_2}{I_2 - I_1}\right)(V_2 - V_1) - (V_3 - V_2)$$

The ADC 255 implements the measurement of the PTAT voltage, this measured PTAT voltage then being available for use calculating the die temperature. In order to facilitate this computation of the PTAT voltage by the ADC 255 according to certain embodiments, current rotation switches 215a, 215b are configured to select pairs of input current levels that are in certain ratios to one another. More particularly, the ratio of currents selected by the current rotation switches 215a, 215b may be chosen such that the term, $(I_3-I_2/I_2-I_1)$ from the above $V_{PTAT}$ equation is a whole number. Chosen in this manner, this term and the remaining terms in the above $V_{PTAT}$ equation can be calculated using an integrator component of ADC 255 using a series of addition and subtraction operations.

As illustrated FIG. 2, the ADC 255 receives four voltage inputs. Two of the voltage inputs are comprised by a pair of thermal voltages 245 generated by the thermal voltage source 205. The pair of thermal voltages 245 may be generated by either pair of diodes 235a-b or 240a-b. The configuration of the diode selection switches 220a, 220b determines whether a pair of thermal voltage outputs are generated using diodes 235a and 235b, or using diodes 240a and 240b. Based on the configuration of the diode selection switches 220a, 220b and switches 225, 230, the pair of thermal voltages outputs generated using either pair of diodes can be routed as inputs 245 to ADC 255.

In addition to this pair of thermal voltage inputs 245, the ADC 255 also receives two external reference voltage signals 250 as inputs. Together, the thermal voltage inputs 245 and the reference voltages inputs 250 are used by the ADC 255 to implement a ratio metric measurement system that can be used to measure the difference between the pair of thermal voltage inputs 245. In order to further improve the accuracy of these thermal voltage inputs 245 to the ADC, the illustrated embodiment utilizes a force sense connection implemented by switches 225 and 230. This force sense connection minimizes the impact of the respective resistances of current rotation switches 215a, 215b and diode selection switches 220a, 220b when measuring the thermal voltages of didoes 235a-b and 240a-b.

As described above, a source of measurement errors in conventional temperature sensor is the non-linear series resistance that may be exhibited by a diode or other component used to generate a thermal voltage output. The equations that govern calculation of temperature based on thermal voltage in conventional devices assume that the series resistance of a diode is constant at each forced current level. Due to this assumption, any non-linear series resistance responses to different forced currents results in measurement error. By using the force sense connections illustrated in FIG. 2, the impact of the series resistance associated with the current rotation switches 215a, 215b and diode selection switches 220a, 220b is eliminated and the only remaining resistance that must be accounted for is the internal resistance of the individual diodes, 235a-b, 240a-b, which is less likely to exhibit any non-linear behavior.

The use of a force sense connection to provide inputs to the ADC in certain embodiments provides further advantages with regard to the operation of the ADC itself. In some scenarios, calibration within a few micro volts may be obtained. In addition, the gain error of the ADC may be reduced by rotating through the input sampling capacitors of the ADC. Where the inputs to the ADC form a force sense connection, rotating these capacitors serves to reduce gain error in the ADC by configuring the use of the same input sampling capacitors on both the thermal voltage and reference voltage inputs to the ADC. In some scenarios, gain error of the ADC may be reduced to a level in the order of a few millipercent.

Using the calculated differences between the thermal voltage inputs 245 to the ADC 255, the die temperate is calculated. The above $V_{PTAT}$ calculation can be re-written into the equation below, which can be solved for the die temperature, T. Written in this form, the below equation relies on ratios of currents rather than the magnitude of any individual current. Consequently, unlike the conventional forced current technique described above, embodiments are not reliant on having highly precise currents as forced current inputs. Instead, embodiments rely on calculations that are sensitive to the ratios of current sources, $I_1$, $I_2$ and $I_3$, that are selected by the current rotation switches 215a, 215b.

$$V_{PTAT} = \frac{nkT}{q}\left[\left(\frac{I_3 - I_2}{I_2 - I_1}\right)\ln\left(\frac{I_2}{I_1}\right) - \ln\left(\frac{I_3}{I_2}\right)\right]$$

By choosing input currents that are of specific ratios to each other, the measurement of the PTAT voltage can be calculated by ADC 255. Since the thermal voltage outputs relied upon by ADC 255 in measuring the PTAT voltage are differenced pairs of voltages, the accuracy of the sensor measurements is significantly less dependent on the precision of the external currents used to force the individual thermal voltages. By using three or more source currents, the accuracy and reliability of the calculation of the PTAT voltage can be further improved due to elimination of certain variables from the equations used to calculate the die temperature.

Both the thermal voltage source 205 used to generate thermal voltage outputs and the ADC 255 used to generate measurements of the thermal voltage outputs are integrated components of the temperature sensor circuitry. In certain embodiments, the pairs of diodes 235, 240 are included in an integrated circuit utilized by the temperature sensor and thus operable for generating thermal voltages correlated to the temperature of the die on which the integrated circuit is implemented. The diode selection switches 220a-b, current rotation switches 215a-b, switches 225 and 230, current sources 210 are also components of this same integrated circuit.

By implementing these components on an integrated circuit of the temperature sensor, embodiments are able to avoid or at least mitigate several of the disadvantages and sources of inaccurate measurements that exist in conventional temperature sensors. With the thermal voltage source 205 components used to generate the measured thermal voltages and the ADC 255 component use to measure these thermal voltages all located within the temperature sensor, current leakage is mitigated. In the conventional temperature sensor of FIG. 1, the accuracy of the thermal voltage measurement depend directly on the precision of the forced currents. Embodiments, on the other hand, rely on generating pairs of thermal voltage outputs within an integrated circuit of the temperature sensor itself, such that once these thermal voltage is generated, the ratio between the two thermal voltages is only minimally affected by leakage. The transmission of this ratio of thermal voltages within the integrated circuit can be expected to provide up to two orders of magnitude improvement in leakage when compared to the use of board-level inputs for receiving externally generated currents.

By including the thermal voltage source 205 and the ADC 255 as components of an integrated circuit of the temperature sensor, noise reduction improvement may also be achieved. Internal components and signals generated using these internal components, in particular the ratios of thermal voltage outputs, are better insulated from external noise sources. Additionally, using internal components allows for any noise that is generated in the ratios of the thermal voltage outputs to be minimized by proper layout of these components within the temperature sensor circuitry and using shielding of sensitive traces. Any external noise present in the input currents is mitigated by the use of differencing in thermal voltage between two different diodes. As opposed to the effects of noise in measuring the magnitude of a thermal voltage, differencing two signals subjected to the same noise will result in the noise being cancelled from the resulting signal. With fewer noise effects, accuracy of the temperature sensor measurements is improved according to various embodiments.

Another improvement provided by embodiments such as illustrated in FIG. 2 that utilize two pairs of diodes 235 and 240 is a reduction in temperature measurement errors due to thermal settling. As described above, errors may result from various delays in the time needed for the thermal voltage output of the diode to settle to a stable output. By utilizing differencing of the thermal voltage outputs of two different diodes, thermal settling errors are largely cancelled out. In scenarios where the two different diodes have the same drifting and settling characteristics, these errors may be eliminated entirely.

Another conventional source of temperature measurement errors that is addressed by various embodiments is the inaccuracy caused by internal heating of the diodes. As described, the longer the settling time required to obtain a measurement, the greater the heat that accumulates in the diode itself. Using components that are internal to sensor circuitry, thermal voltages suitable for differencing can be generated much more quickly than the conventional process that requires waiting for external currents sources to settle to a stable output. In some embodiments, thermal voltage signals that can be accurately differenced can be generated by forcing currents into the diodes for approximately two microseconds. By reducing the time necessary to generate the thermal voltage outputs necessary for a measurement, there is less time for internal heating of the diode to impact the accuracy of the measurement.

In addition to the above advantages provided by embodiments resulting from the ability to conduct test measurements more quickly using components internal to the temperature sensor circuitry, taking less time to generate individual temperature measurements also reduces the overall time needed obtain the temperature measurements needed to trim the sensor. In some scenarios, internal measurements may be generated using various embodiments up to ten times more quickly than conventional temperature measurements. In a mass production environment, these saving can result in substantial efficiency improvements.

As described above, conventional temperature measurements assume a diode is operating according to its technical specifications. A certain degree of variance in the operation of a diode are accounted through the use of ideality factors. As described, variances in the diode operation that exceed those accounted for by the ideality factor will result in measurement error by the temperature sensor. FIG. 3 illustrates certain components of a temperature sensor according to certain embodiments, such that the sensor is configured to identify detective diodes that operate outside of their ideality factors.

As with the sensor of FIG. 2, two pairs of diodes 335a-b and 340a-b are utilized in the embodiment of FIG. 3. However, in the embodiment of FIG. 3, the diodes of each pair of diodes are of different types. More precisely, the two diodes of pair 335a-b are of first type and the two diodes of pair 340a-b of a second type, different from the first type but also capable of generating a thermal voltage. In certain embodiments, one pair of diodes are diode-connected PNP BJTs and the other pair of diodes are diode-connected NPN BJTs. Two diodes from different pairs of diodes are utilized in the embodiment of FIG. 3 in order to evaluate whether each of the two diodes is operating within its respective ideality factor.

In one scenario, the temperature sensor circuit of FIG. 3 may be configured to test the diodes 335a-b of a first type against the diodes 340a-b of a second type in order to identify potentially defective diodes. As with the embodiment of FIG. 2, the current rotation switches 315 are configured to select two different currents from current source 310 and to apply the two selected currents to one pair of diodes, for instance the two diodes 335a-b of a first type. As before, the ADC 355 is configured to receive external reference voltages 350 and the thermal voltage inputs 345 that are generated by the selected pair of diodes, in this example diodes 335a-b. As before, a series of such thermal voltage measurements are made using different currents selected by the current rotation switches 315, such that the different currents are at specific ratios to each other. The ADC 355 is further configured to calculate a PTAT voltage from these thermal voltage readings, which indicates the temperature of the die. This same process is then repeated using the other pair of diodes, in this example, the two diodes 340a-b of a second type. A second PTAT voltage and die temperature reading is thus generated. If the two die temperature readings generated by the two pairs of diodes do not match, this is indicative of a defective diode in one of the two pairs.

By using different diode types for each of the two pairs of diodes, the embodiment of FIG. 3 provides information that can be used to diagnose whether each diode is operating according to its associated ideality factor. In the above scenario, the thermal voltage output of diodes 335a-b of a first type is compared against the thermal voltage output of diodes 340a-b of a second type. Being of different types, the two diodes being tested, 335a-b and 340a-b, may have different ideality factors. Once the difference between the thermal voltage outputs of the two diodes is calculated by the ADC 355, the degree to which the two diodes operate within their ideality factors is isolated. Any discrepancy between the thermal voltage outputs of the two diodes that is greater than the normally allowed process variation of the ideality factor of either diode type indicates that at least one of the diodes could be malfunctioning. According to various embodiments, information provided by such tests allows diodes to be identified that are not operating within the variances specified by their ideality factor.

The identification of defective diodes can be further improved according to the various embodiments by modifying the above to test two diodes of the same type against each other. This mechanism for identifying defective diodes can be implemented in the embodiments of both FIG. 2 and FIG. 3. Referring to the embodiment of FIG. 3, the circuit may be reconfigured such that the same current is forced to diode 335a and 335b, both of a first type. The current rotation switches 315a-b are configured to select equal current sources to be provided to both diode selection switch 320a and diode selection switch 320b. In this test, diode selection switch 320a is configured to force the selected current to diode 335a and diode selection switch 320b is configured to force an equal current to diode 335b. Switches 325 and 330 are each configured to provide these thermal voltage outputs of diode 335a and diode 335b as inputs 345 to the ADC 355. Any discrepancy between the thermal voltage outputs of diodes 335a and 335b that is greater than the tolerances that are normally allowed to account for process variations in the diodes is indicative of a defect in one of these two diodes.

Using these techniques for isolating discrepancies in the operation of individual diodes, embodiments can generate information that can be used to identify diodes with defects that appear to impact the measurement accuracy of the diode. By identifying defective diodes at this stage of the manufacturing process, less effort is wasted in attempting to trim a temperature sensor with a defective thermal voltage source. In a mass production environment, any such savings can be substantial. In addition, overall quality of the produced temperature sensors is improved by removing defective components and by confirming that diodes are operating according to their specifications.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A circuit for sensing a temperature of an integrated circuit die including the circuit, the circuit comprising:
   a thermal voltage source operable to generate a series of pairs of thermal voltages, each varying with the temperature of the die, the thermal voltage source including:
      at least one pair of components to generate successive ones of the series of pairs of thermal voltages, each generated in response to a current, current source circuitry to selectively provide at least three successive pairs of currents, each pair of currents with different current levels, and current rotation circuitry to selectively provide to the at least one pair of components, the successive pairs of currents of different levels, to generate the series of pairs of thermal voltages; and an ADC operable to receive an external reference voltage provided as an input to the integrated circuit die, and further operable to receive the series of pairs of thermal voltages and to determine a PTAT voltage corresponding to the temperature of the integrated circuit die based on the series of pairs of thermal voltages and the external reference voltage.

2. The circuit of claim 1, wherein the at least one pair of components comprises a first pair of diodes configured to generate a first pair of thermal voltage outputs.

3. The circuit of claim 2, wherein a pair of diagnostic thermal voltages is generated by forcing the same current onto both diodes from the first pair of diodes, and wherein the diagnostic pair of thermal voltages is used to detect defects with the first pair of diodes.

4. The circuit of claim 2, wherein the thermal voltage source is further comprised of a second pair of diodes configured to generate a second pair of thermal voltage outputs.

5. The circuit of claim 4, wherein the ADC is further operable to determine the difference between the first pair of thermal voltages or the difference between the second pair of thermal voltages.

6. The circuit of claim 4, wherein the first pair of diodes comprises two matching diodes of a first type and the second pair of diodes comprise two diodes of a second type.

7. The circuit of claim 6, wherein the first pair of diodes generate a first thermal voltage and the second pair of diodes generate a second thermal voltage, and wherein a discrepancy in the first thermal voltage and the second thermal voltage is used to detect a discrepancy in an ideality factor of a diode from the first pair of diodes or the second pair of diodes.

8. The circuit of claim 1, wherein the ratios between each of the three different currents levels are selected such that the ADC calculates the PTAT voltage using addition and subtraction operations.

9. The circuit of claim 1, wherein the thermal voltage inputs to the ADC are generated using a force sense connection.

10. A method for calculating the temperature of an integrated circuit die, the method comprising:

generating a series of pairs of thermal voltages by forcing successive pairs of currents, each pair of currents with different current levels, into at least one pair of thermal voltage components integrated into the die, wherein each of the series of thermal voltages varies with the temperature of the integrated circuit die;

receiving an external reference voltage provided as an input to the integrated circuit die; and determining a PTAT voltage corresponding to the temperature of the integrated circuit die based on the generated series of pairs of thermal voltages and the external reference voltage.

11. The method of claim 10, wherein the series of pairs of thermal voltages are generated using a first pair of diodes configured to generate a first pair of thermal voltage outputs.

12. The method of claim 11, wherein the series of pairs of thermal voltages are further generated using a second pair of diodes configured to generate a second pair of thermal voltage outputs.

13. The method of claim 12, the method further comprising:

determining the difference between the first pair of thermal voltages or the difference between the second pair of thermal voltages.

14. The method of claim 13, wherein the ratios between each of the three different current levels are selected such that the PTAT voltage is calculated using ADC addition and subtraction operations.

15. The method of claim 12, wherein the first pair of diodes comprises two matching diodes of a first type and the second pair of diodes comprise two diodes of a second type.

16. The method of claim 15, further comprising:

comparing a first thermal voltage generated by the first pair of diodes and a second thermal voltage generated by the second pair of diodes to identify a discrepancy in an ideality factor of a diode from the first pair of diodes or the second pair of diodes.

17. The method of claim 11, the method further comprising:

generating a pair of diagnostic thermal voltages by forcing the same current onto both diodes from the first pair of diodes, wherein the diagnostic pair of thermal voltages is used to detect defects with the first pair of diodes.

18. The method of claim 10, wherein the thermal voltage inputs are generated using a force sense connection.

* * * * *